(12) United States Patent
Kucharski

(10) Patent No.: US 7,106,573 B2
(45) Date of Patent: Sep. 12, 2006

(54) PROTECTION CIRCUIT FOR A DIGITAL SUBSCRIBER LINE DEVICE

(75) Inventor: Janusz M. Kucharski, Torrance, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 396 days.

(21) Appl. No.: 10/462,471

(22) Filed: Jun. 16, 2003

(65) Prior Publication Data

US 2004/0252436 A1    Dec. 16, 2004

(51) Int. Cl.
*H02H 1/00* (2006.01)
(52) U.S. Cl. ...................... 361/119; 361/117
(58) Field of Classification Search ............... 361/117, 361/118, 119
See application file for complete search history.

(56) References Cited

U.S. PATENT DOCUMENTS 5,142,429 A * 8/1992 Jaki ............................ 361/56
6,377,435 B1 * 4/2002 Nabell et al. ............... 361/119
6,628,498 B1 * 9/2003 Whitney et al. ............. 361/119

* cited by examiner

*Primary Examiner*—Brian Sircus
*Assistant Examiner*—Danny Nguyen
(74) *Attorney, Agent, or Firm*—Fogg and Associates LLC; Jon M. Powers

(57) ABSTRACT

A protection circuit for a DSL transceiver unit includes a capacitor connected in series between a first and second portion of a primary winding of a transformer. The first and second portions are coupled to first and second lines, respectively, of a twisted-pair telephone line. A first voltage controlled device is coupled to the first line and a chassis ground. The first voltage controlled device has a first threshold turn-on voltage at which the first voltage controlled device provides a first current path from the first line to chassis ground. A resistive device and a second voltage controlled device are coupled across the capacitor in series. The second voltage controlled device has a second threshold turn-on voltage at which the second voltage controlled device provides a second current path from a first capacitor terminal of the capacitor to a second capacitor terminal of the capacitor. The second threshold turn-on voltage is lower than the first threshold turn-on voltage.

21 Claims, 1 Drawing Sheet

PROTECTION CIRCUIT FOR A DIGITAL SUBSCRIBER LINE DEVICE

TECHNICAL FIELD

Figure 1:
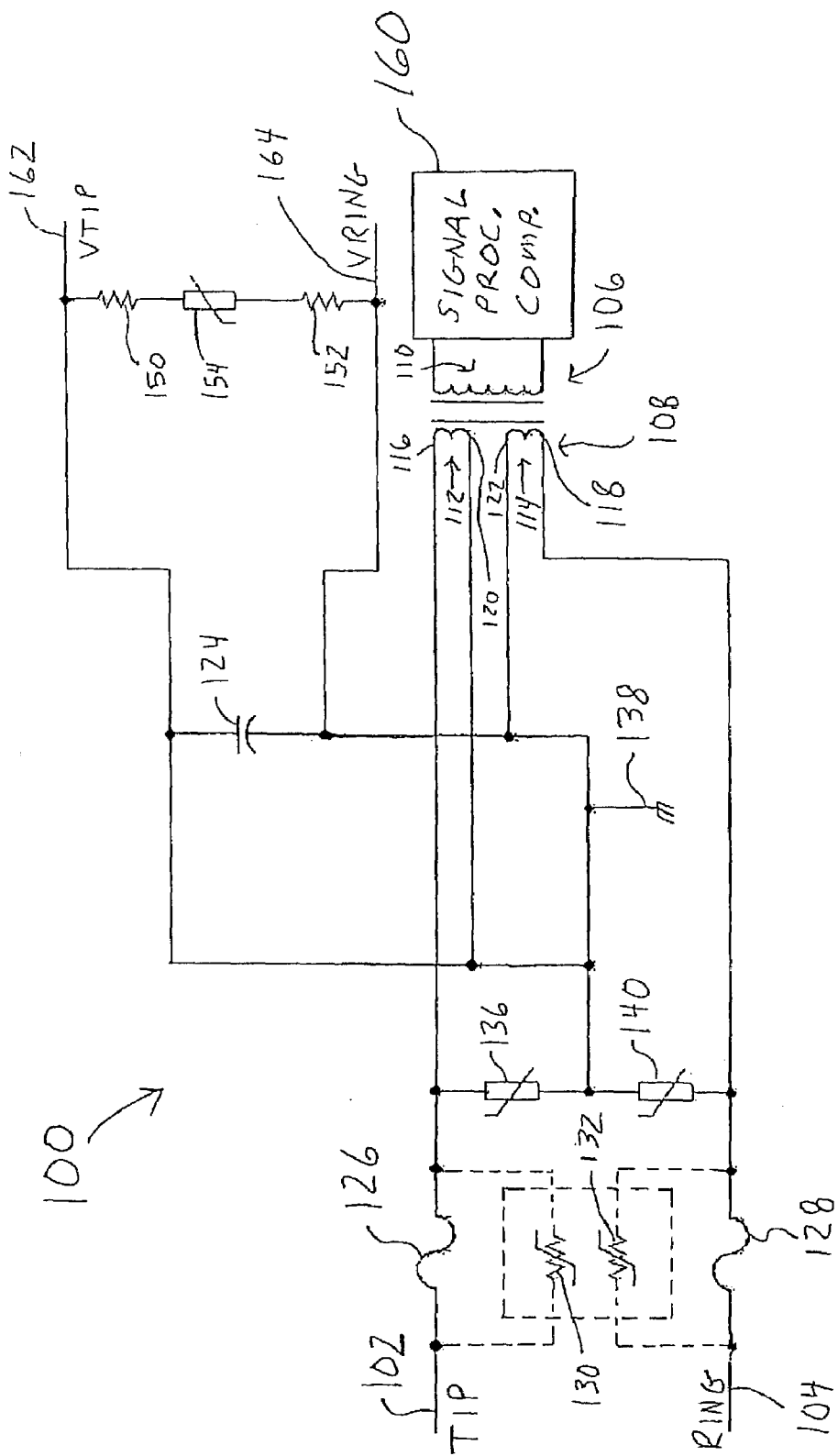

The following description relates to telecommunications in general and to a protection circuit suitable for use in a digital subscriber line (DSL) device in particular.

BACKGROUND

One way in which telecommunication service providers provide high-speed digital communication services is by using digital subscriber line (DSL) technology. In one typical configuration, a high-bit rate digital subscriber line (HDSL2) transceiver unit located in a central office of a service provider communicates with an HDSL2 transceiver unit located at a remote site. The former transceiver unit is also referred to here as an "H2TU-C" and the latter transceiver unit is also referred to here as an "H2TU-R". The H2TU-C communicates with the H2TU-R over a single twisted-pair telephone line using HDSL2 technology.

The twisted-pair telephone line is typically coupled to the H2TU-R using an isolation transformer. The isolation transformer has a primary winding that is coupled to the twisted-pair telephone line and a secondary winding that is coupled to the signal processing components of the H2TU-R (for example, an analog front end, line driver, etc.). The tip and ring lines of the twisted-pair telephone line are coupled to tip and ring terminals, respectively, of an HDSL2 port included in the H2TU-R.

It is often the case that the H2TU-R is powered by the twisted-pair telephone line. In one embodiment of a line-powered H2TU-R, the primary winding of the isolation transformer has two halves. One half of the primary winding is coupled to the tip line of the twisted-pair telephone line (via the tip terminal of the HDSL2 port) and the other half of the primary winding is coupled to the ring line of the twisted-pair telephone line (via the ring terminal of the HDSL2 port). The two halves of the primary winding are connected using a capacitor having a relatively high capacitance (for example, on the order of 1.8 microfarads). The power voltage for the H2TU-R is taken across this capacitor.

The H2TU-R typically includes multi-stage protection circuitry intended to protect the signal processing components of the H2TU-R from electrical surges and other conditions that may occur over the twisted-pair telephone line. Typically, such protection circuitry includes a primary protection circuit that includes a pair of gas discharge tubes. One of the gas discharge tubes is coupled between the tip line of the twisted-pair telephone line and chassis ground for the H2TU-R. The other gas discharge tube is coupled between the ring line of the twisted-pair telephone line and chassis ground. The gas discharge tubes typically have a relatively high turn-on voltage (for example, around 1200 volts) and can handle large currents for brief periods of time (for example, from around 5,000 amps to around 10,000 amps for around 1 millisecond). When an electrical surge causes a voltage greater than the turn-on voltage to be established across one of the gas discharge tubes, the gas discharge tube turns on and the current associated with the surge is shunted to chassis ground and away from the other components of the H2TU-R coupled to the twisted-pair telephone line.

The multistage protection circuitry of such an H2TU-R also typically includes a secondary protection circuit. A typical secondary protection circuit includes a pair of fuses or positive thermal coefficient (PTC) thermistors. One fuse or PTC thermistor is in series between the tip line and one half of the primary winding. The other fuse or PTC thermistor is in series between the ring line of the twisted-pair telephone line and the other half of the primary winding. This provides overcurrent protection. The secondary protection circuit also typically includes a pair of transient voltage suppressor devices (for example, a SIDACTOR(R) silicon controlled rectifier (SCR)-type (also referred to as a "thyristor") transient voltage suppressor device available from Teccor Electronics) to provide overvoltage protection. One transient voltage suppressor is coupled between the tip line of the twisted-pair telephone line and chassis ground. The other transient voltage suppressor is coupled between the ring line of the twisted-pair telephone line and chassis ground. The transient voltage suppressor devices, in one configuration, have turn-on voltages of between approximately 275 volts and approximately 350 volts. The secondary protection circuit is intended to protect the signal processing components of the H2TU-R from electrical surges that are not stopped by the primary protection circuit.

One type of surge that the protection circuitry is intended to protect the signal processing components of the H2TU-R from is an alternating current (AC) power cross surge. An AC power cross surge occurs when one of the lines of the twisted-pair telephone line comes into electrical contact with a 60 hertz (Hz) AC power line. The GR-1089 standard promulgated by Telcordia Labs specifies a first level AC power cross surge test. See, for example, test number 3 from Table 4-7 of the GR-1089 Telcordia standard. In this test, a 60 Hz, 600 volts AC, 1 amp signal is applied across the tip and ring terminals of the HDSL2 port. During each half of each cycle, the capacitor that couples the two halves of the primary winding of the isolation transformer is charged up by current resulting from the incoming surge.

When the voltage across that capacitor exceeds the turn-on voltage for one of the transient voltage suppressors, the transient voltage suppressor turns on and provides a current path to chassis ground. This causes the charged capacitor to discharge through both halves of the primary winding of the transformer and on through the transient voltage suppressor to chassis ground. Due to the relatively low resistance in this current path, a very high current flows through the primary winding of the transformer. This can lead to the induction of a destructive voltage surge on the secondary winding of the transformer, which can potentially damage the signal processing components of the H2TU-R that are coupled to the secondary winding. The high current flowing through the transformer can also cause a gradual heating of the transformer windings, which can cause the transformer to deteriorate and ultimately fail. The process of charging and discharging the capacitor occurs up to about 10 times during each half of each 60 Hz cycle. In other words, during such test, the capacitor is charged and discharged up to about 1200 times during a one second period.

SUMMARY

In one embodiment, a protection circuit for a telecommunication device communicates over a twisted-pair telephone line having a first line and a second line. The protection circuit includes a transformer having a primary winding and a secondary winding. The primary winding has a first portion and a second portion. The first portion is coupled to a first line terminal adapted to couple the protection circuit to the first line. The second portion is coupled to a second line terminal adapted to couple the protection circuit to the second line. The protection circuit further includes a capacitor connected in series between the first portion of the primary winding and the second portion of the primary winding. The protection circuit further includes a first voltage controlled device coupled to the first line terminal and a ground terminal. The first voltage controlled device has a first threshold turn-on voltage at which the first voltage controlled device provides a first current path from the first line terminal to the ground terminal. The protection circuit further includes a second voltage controlled device coupled across the capacitor. The second voltage controlled device has a second threshold turn-on voltage at which the second voltage controlled device provides a second current path from a first capacitor terminal of the capacitor to a second capacitor terminal of the capacitor. The second threshold turn-on voltage is lower than the first threshold turn-on voltage.

In one embodiment, a protection circuit for a high bit rate digital subscriber line transceiver unit communicates over a twisted-pair telephone line having a first line and a second line. The protection circuit includes a transformer having a primary winding and a secondary winding. The primary winding has a first portion and a second portion. The first portion is coupled to a first line terminal adapted to couple the protection circuit to the first line. The second portion is coupled to a second line terminal adapted to couple the protection circuit to the second line. The protection circuit further includes a capacitor connected in series between the first portion of the primary winding and the second portion of the primary winding. The protection circuit further includes a first voltage controlled device coupled to the first line terminal and a ground terminal. The first voltage controlled device has a first threshold turn-on voltage at which the first voltage controlled device provides a first current path from the first line terminal to the ground terminal. The protection circuit further includes a resistive device and a second voltage controlled device connected in series. The resistive device and the second voltage controlled device are coupled across the capacitor. The second voltage controlled device has a second threshold turn-on voltage at which the second voltage controlled device provides a second current path from a first capacitor terminal of the capacitor to a second capacitor terminal of the capacitor. The second threshold turn-on voltage is lower than the first threshold turn-on voltage.

The details of one or more embodiments of the claimed invention are set forth in the accompanying drawings and the description below. Other features and advantages will become apparent from the description, the drawings, and the claims.

DRAWINGS

FIG. 1 is a block diagram of one embodiment of a protection circuit.

Like reference numbers and designations in the various drawings indicate like elements.

DETAILED DESCRIPTION

FIG. 1 is a block diagram of one embodiment of a protection circuit 100. The embodiment of protection circuit 100 shown in FIG. 1 is suitable for use in a secondary protection circuit of an HDSL2 terminal receiver unit remote (H2TU-R). It is to be understood, however, that other embodiments of protection circuit 100 are suitable for use in other applications. Other such applications include secondary protection circuits for other telecommunication devices that are coupled to one or more twisted-pair telephone lines.

The protection circuit 100 includes a tip terminal 102 and a ring terminal 104. A tip line of a twisted-pair telephone line (not shown in FIG. 1) is coupled to the tip terminal 102 and a ring line of the twisted-pair telephone line is coupled to the tip terminal 104 in order to couple the twisted-pair telephone line to the protection circuit 100. For example, in one embodiment, the tip terminal 102 and ring terminal 104 are connected to a card edge connector (not shown) that is used to electrically couple the H2TU-R to a twisted-pair telephone line.

Protection circuit 100 is suitable for use with a line powered telecommunication device. The embodiment of protection circuit 100 shown in FIG. 1 includes an isolation transformer 106 of the type typically used in line-powered HDSL2 remote terminals. The transformer 106 includes a primary winding 108 and a secondary winding 110. The primary winding 108 is separated into a first half 112 and a second half 114. A first terminal 116 of the first half 112 of the primary winding 108 is coupled to the tip terminal 102. A first terminal 118 of the second half 114, respectively, of the primary winding 108 is coupled to the ring terminal 104. Other terminals 120 and 122 of the first half 112 and the second half 114 of the primary winding 108 are connected using a capacitor 124. In the embodiment shown in FIG. 1, a capacitor having a relatively high capacitance is used (for example, 1.8 microfarads). Power circuitry (not shown in FIG. 1) is coupled to the protection circuit 100 across the capacitor 124 using VTIP terminal 162 and VRING terminal 164.

The secondary winding 106 is connected to various signal processing components 160. For example, in the embodiment shown in FIG. 1, the secondary winding 106 is coupled to HDSL2 signal processing components such as an analog front end, line driver, hybrid circuit, etc. A suitable transformer for such an exemplary embodiment is part number S560-6600-FC from Bel Fuse Inc.

In one embodiment shown in FIG. 1, a first fuse 126 is connected in series between the tip terminal 102 and the first terminal 116 of the first half 112 of the primary winding 108. A second fuse 128 is connected in series between the ring terminal 104 and the first terminal 118 of the second half 114 of the primary winding 108. In an alternate embodiment shown in FIG. 1 using dashed lines, a pair of PTC thermistors are used instead of the fuses 126 and 128. It is to be understood, however, that in other embodiments various types of fuse devices (such as fuses or PTC devices) are used alone or in combination with other such devices. In such an alternate embodiment, a first PTC thermistor 130 is connected between the tip terminal 102 and the first terminal 116 of the first half 112 of the primary winding 108. A second PTC thermistor 132 is connected in series between the ring terminal 104 and the first terminal 118 of the second half 114 of the primary winding 108. In one embodiment, a dual PTC thermistor having 1 Ohm to 5 Ohms of resistance is used. Fuses 126 and 128 and/or PTC thermistors 130 and 132 are intended to provide overcurrent protection.

A first transient voltage suppressor device 136 is connected between the tip terminal 102 and chassis ground 138, and a second transient voltage suppressor device 140 is connected between the ring terminal 104 and chassis ground 138. The first and second voltage suppressor devices 136 and 138 (also referred to here as the "front" transient voltage suppressor devices 136 and 140) are intended to provide overvoltage protection. In the embodiment shown in FIG. 1, SCR-type transient voltage suppressor devices are used. In normal operation, the transient voltage suppressors 136 and 140 are effectively invisible to the protection circuit 100. When the voltage across one of the transient voltage suppressor devices 136 or 140 reaches a turn-on voltage, the transient voltage suppressor device turns on and provides a current path to chassis ground 138. In the embodiment shown in FIG. 1, the transient voltage suppressor devices 136 and 140 have a turn-on voltage in the range of approximately 275 volts to approximately 350 volts. A transient voltage suppressor device suitable for use in the embodiment shown in FIG. 1 is a SIDACTOR(R) SCR-type transient voltage suppressor device, part number P3100SC, from Teccor Electronics. Although the embodiment shown in FIG. 1 uses one or more transient voltage suppressor devices, it is to be understood that other suitable voltage controlled devices are used in other embodiments. In such other embodiments, such a voltage-controlled device provides a current path between the terminals of the device when a voltage across the device is within a particular turn-on voltage range.

Protection circuit 100 also includes at least one resistance device and at least one transient voltage suppressor device in series across the capacitor 124. In the embodiment shown in FIG. 1, the at least one resistance device includes first and second resistors 150 and 152 in series with one transient voltage suppressor device 154 across the capacitor 124. The transient voltage suppressor device 154 has a turn-on voltage that is lower than the turn-on voltage of the front transient voltage suppressor devices 136 and 140. The values of the resistors 150 and 152 are selected so as to limit the amount of current that runs through the transient voltage suppressor device 154 when the transient voltage suppressor device 154 is turned on. The resistor values are selected so as to limit the current to levels suitable for the transient voltage suppressor device 154. Resistor 150 and resistor 152 are 1 ohm resistors in the embodiment shown in FIG. 1. In the embodiment shown in FIG. 1, the transient voltage suppressor device 154 includes a SCR-type transient voltage suppressor device having a turn-on voltage in the range of approximately 190 volts to approximately 260 volts. A transient voltage suppressor device suitable for use in the embodiment shown in FIG. 1 is a SIDACTOR(R) SCR-type transient voltage suppressor device, part number P2300SD, from Teccor Electronics. Although the embodiment shown in FIG. 1 uses one or more transient voltage suppressor devices, it is to be understood that other suitable voltage controlled devices are used in other embodiments. In such other embodiments, such a voltage-controlled device provides a current path between the terminals of the device when a voltage across the device is within a particular turn-on voltage range.

Embodiments of protection circuit 100 provide secondary protection against, at least, two types of electrical surges. A primary protection circuit is typically coupled to the protection circuit 100. For example, in one embodiment, a first gas discharge tube (not shown) is coupled across the tip terminal 102 and chassis ground 138, and a second gas discharge (not shown) tube is coupled across the ring terminal 104 and chassis ground 138. This primary protection circuit will typically limit the amount of current supplied to the secondary protection circuit 100 and the signal processing components 160 coupled thereto to less than 600 Vac, 1000 volts peak, and less than 100 amps in a 1 millisecond period.

One type of electrical surge that embodiments of protection circuit 100 provide secondary protection against is a lightning surge. When a lightning surge occurs, one or both of the front transient voltage suppressor devices 136 and 140 turns on before any of the gas discharge tubes in the primary protection circuit turn on because the turn-on voltage for the transient voltage suppressor devices 136 and 140 are lower than the turn-on voltage for the gas discharge tubes. In the embodiment shown in FIG. 1, the transient voltage suppressor devices 136 and 140 have a turn-on voltage of around 300 volts while the the turn-on voltage for the gas discharge tube is typically 300 to 1000 volts.

One of the front transient voltage suppressor devices 136 and 140 in the protection circuit 100 turns on when the lightning surge causes a voltage exceeding the turn-on voltage for that device to be developed across the device. When one of the front transient voltage suppressor devices 136 and 140 turns on, the device provides a short circuit (that is, a current path having low resistance) to chassis ground 138. However, the front transient voltage suppressor devices 136 and 140 are not designed to handle the thousands of amps of current that can result from a lightning surge. The PTC resistors 130 and 132 develop a voltage between the front transient voltage suppressor device 136 or 140 and the gas discharge tube sufficient to turn on the gas discharge tube.

Another type of electrical surge that embodiments of protection circuit 100 provide secondary protection against is an AC power cross surge. As noted above, an AC power cross surge occurs when one of the lines of the twisted-pair telephone line come into electrical contact with a 60 hertz (Hz) AC power line. One example of an AC power surge occurs during the AC power cross surge test specified in the Telcordia GR-1089 standard. In this test, a 60 Hz, 600 volts AC, 1 amp signal is applied across the tip and ring terminals 102 and 104. During each half of each cycle, the capacitor 124 is charged up by the current resulting from the incoming surge.

Because the turn-on voltage for the transient voltage suppressor device 154 is less than the turn-on voltage for the front transient voltage suppressor devices 136 and 140, the transient voltage suppressor device 154 will turn on before the the latter devices. When the voltage across that capacitor 124 exceeds the turn-on voltage for the transient voltage suppressor device 154, the transient voltage suppressor device 154 turns on and provides a current path to chassis ground 138. This causes the capacitor 124 to discharge through this current path. This current path to chassis ground 138 does not pass through the primary winding 108 of the transformer 106. The capacitor charging process is then repeated.

Because the capacitor 124 is discharged when the voltage across the capacitor 124 exceeds the threshold turn-on voltage of the transient voltage suppressor 154, the voltage across the capacitor 124 typically does not reach a level sufficient to turn on either of the front transient voltage suppressor devices 138 and 140. As a result, the capacitor 124 does not discharge through either halves 112 and 114 of the primary winding 108 of the transformer 106 during the AC power cross surge cycles. As a consequence, the negative effects of discharging the capacitor 124 through the primary winding 108 of the transformer 106 are reduced. For example, this reduces the likelihood that a destructive voltage surge will be induced in the secondary winding 110 from such high current passing through the primary winding 108. Moreover, this reduces the amount of heating of the primary winding 108 due to a high current flowing through the primary winding 108, during a surge.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A protection circuit for a telecommunication device that communicates over a twisted-pair telephone line having a first line and a second line, the protection circuit comprising:
    a transformer having a primary winding and a secondary winding, the primary winding having a first portion and a second portion, wherein the first portion is coupled to a first line terminal adapted to couple the protection circuit to the first line, and the second portion is coupled to a second line terminal adapted to couple the protection circuit to the second line;
    a capacitor connected in series between the first portion of the primary winding and the second portion of the primary winding;
    a first voltage controlled device coupled to the first line terminal and a ground terminal, wherein the first voltage controlled device has a first threshold turn-on voltage at which the first voltage controlled device provides a first current path from the first line terminal to the ground terminal; and
    a second voltage controlled device coupled across the capacitor, wherein the second voltage controlled device has a second threshold turn-on voltage at which the second voltage controlled device provides a second current path from a first capacitor terminal of the capacitor to a second capacitor terminal of the capacitor; and
    wherein the second threshold turn-on voltage is lower than the first threshold turn-on voltage.

2. The protection circuit of claim 1, further comprising a resistive device connected in series with the second voltage controlled device, wherein the resistive device and the second voltage controlled device are coupled across the capacitor.

3. The protection circuit of claim 2, wherein the resistive device includes a resistor.

4. The protection circuit of claim 3, wherein the resistive device includes a plurality of resistors.

5. The protection circuit of claim 1, wherein the first voltage controlled device includes an SCR-type transient voltage suppressor device.

6. The protection circuit of claim 1, wherein the second voltage controlled device includes an SCR-type transient voltage suppressor device.

7. The protection circuit of claim 1, further comprising a third voltage controlled device coupled to the second line terminal and the ground terminal, wherein the third voltage controlled device has a third threshold turn-on voltage at which the third voltage controlled device provides a third current path from the second line terminal to the ground terminal, wherein the second threshold turn-on voltage is less than the third threshold turn-on voltage.

8. The protection circuit of claim 1, further comprising a first fuse connected in series between the first line terminal and the first portion of the primary winding.

9. The protection circuit of claim 8, further comprising a second fuse connected in series between the second line terminal and the second portion of the primary winding.

10. The protection circuit of claim 1, further comprising a first positive temperature coefficient device connected in series between the first line terminal and the first portion of the primary winding.

11. The protection circuit of claim 10, further comprising a second positive temperature coefficient device connected in series between the second line terminal and the second portion of the primary winding.

12. The protection circuit of claim 1, wherein the twisted-pair telephone line is adapted to provide a high bit rate digital subscriber line communication link.

13. The protection circuit of claim 1, wherein the telecommunication device includes a high bit rate digital subscriber line transceiver unit.

14. The protection circuit of claim 1, wherein the ground terminal is adapted to couple the protection circuit to a chassis ground.

15. A protection circuit for a high bit rate digital subscriber line transceiver unit that communicates over a twisted-pair telephone line having a first line and a second line, the protection circuit comprising:
    a transformer having a primary winding and a secondary winding, the primary winding having a first portion and a second portion, wherein the first portion is coupled to a first line terminal adapted to couple the protection circuit to the first line, and the second portion is coupled to a second line terminal adapted to couple the protection circuit to the second line;
    a capacitor connected in series between the first portion of the primary winding and the second portion of the primary winding;
    a first voltage controlled device coupled to the first line terminal and a ground terminal, wherein the first voltage controlled device has a first threshold turn-on voltage at which the first voltage controlled device provides a first current path from the first line terminal to the ground terminal; and
    a resistive device and a second voltage controlled device connected in series, wherein the resistive device and the second voltage controlled device are coupled across the capacitor, wherein the second voltage controlled device has a second threshold turn-on voltage at which the second voltage controlled device provides a second current path from a first capacitor terminal of the capacitor to a second capacitor terminal of the capacitor; and
    wherein the second threshold turn-on voltage is lower than the first threshold turn-on voltage.

16. The protection circuit of claim 15, wherein the resistive device includes a resistor.

17. The protection circuit of claim 16, wherein the resistive device includes a plurality of resistors.

18. The protection circuit of claim 15, wherein the first voltage controlled device includes an SCR-type transient voltage suppressor device.

19. The protection circuit of claim 15, wherein the second voltage controlled device includes an SCR-type transient voltage suppressor device.

20. The protection circuit of claim 15, further comprising a third voltage controlled device coupled to the second line terminal and the ground terminal, wherein the third voltage controlled device has a third threshold turn-on voltage at which the third voltage controlled device provides a third current path from the second line terminal to the ground terminal, wherein the second threshold turn-on voltage is lower than the third threshold turn-on voltage.

21. The protection circuit of claim 1, wherein the ground terminal is adapted to couple the protection circuit to a chassis ground.

* * * * *